(12) United States Patent
Wartmann

(10) Patent No.: US 9,563,047 B2
(45) Date of Patent: Feb. 7, 2017

(54) OPTICAL SYSTEM FOR DIGITAL MICROSCOPY

(71) Applicant: Carl Zeiss Microscopy GmbH, Jena (DE)

(72) Inventor: Rolf Wartmann, Waake (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/614,129

(22) Filed: Feb. 4, 2015

(65) Prior Publication Data

US 2015/0219886 A1    Aug. 6, 2015

(30) Foreign Application Priority Data

Feb. 5, 2014   (DE) .................. 10 2014 202 052

(51) Int. Cl.
*G02B 21/02*   (2006.01)
*G02B 21/36*   (2006.01)

(52) U.S. Cl.
CPC ........... *G02B 21/025* (2013.01); *G02B 21/361* (2013.01)

(58) Field of Classification Search
CPC ............................ G02B 21/025; G02B 21/361
USPC ........................................................ 359/368
See application file for complete search history.

(56) References Cited

U.S. PATENT DOCUMENTS

2010/0195198 A1*  8/2010  Langle ............... G02B 27/48
                                                                 359/385

FOREIGN PATENT DOCUMENTS

DE        102009004741        7/2010

OTHER PUBLICATIONS

German Search Report for German Application No. 10 2014 202 052.2, dated Mar. 25, 2014. English Translation provided.

* cited by examiner

*Primary Examiner* — Frank Font
(74) *Attorney, Agent, or Firm* — Patterson Thuente Pederson, P.A.

(57) ABSTRACT

An optical system for digital microscopy having at least one lens, at least one telescope of the Kepler type and tube optics, wherein an aperture is arranged between the telescope and the tube optics, which aperture is imaged by means of the telescope at the rear focal point of the lens and the following conditions are met simultaneously:
 A light conductance value (L) of the lens is ≥1.4,
 A light conductance value (L) of the telescope is ≥0.35,
 A light conductance value (L) of the tube optics is ≥0.35,
  wherein the equation for the light conductance value (L) is $$L = A(\tan \xi,)$$

where A is the pupil diameter and ξ is the angle of gradient of the pencil of light rays in infinite space, and wherein the microscope magnification (Γ) of the telescope is in the range $-\frac{1}{3} \leq \Gamma \leq -3$.

7 Claims, 1 Drawing Sheet

OPTICAL SYSTEM FOR DIGITAL MICROSCOPY

RELATED APPLICATION

The present application claims priority to German Application No. 10 2014 202 052.2 filed Feb. 5, 2014, said priority application being incorporated herein in its entirety by reference.

FIELD OF THE INVENTION

The invention relates to an optical system for digital microscopy having at least one telescope of the Kepler type and tube optics.

BACKGROUND OF THE INVENTION

One of the main features of a digital microscope is the rapid and problem-free creation of digital images and surface models of macro- and microscopic structures. On the one hand, these lead to a better understanding and a better documentation of the sample in the case of a qualitative evaluation. On the other hand, valuable information about the surface properties or the wear thereof can be obtained by a quantification of the surface.

Digital microscopes intentionally do not have the view typical of conventional microscopes. This permits a completely new type of instrument design. In particular, there is enough room for complicated post-enlargement equipment, which is not the case in traditional microscopy.

These powerful post-enlargements have, among other things, resulted in a significant reduction in the need for tedious and uneconomical lens changes. The known digital microscopes available on the market manage with only a few lenses. Post-enlargement is often performed by using complicated zoom systems. Unfortunately, these devices only have low light conduction values, which is why they have only limited suitability for modern techniques in fluorescence microscopy, for example. This situation is complicated further by the fact that infinite space is limited in most cases.

SUMMARY OF THE INVENTION

Proceeding from this prior art, the object of embodiments of the invention is to improve upon an optical system for digital microscopy, so that in addition to increasing the light conduction value, the infinite space is enlarged. According to embodiments of the invention, an aperture arranged between the telescope and the tube optics is imaged by means of the telescope in the rear focal point of the lens, wherein the following conditions are met simultaneously:

A light conduction value (L) of the lens is $\geq 1.4$,
A light conduction value (L) of the telescope is $\geq 0.35$,
A light conduction value (L) of the tube optics is $\geq 0.35$,
wherein the following equation applies for the light conduction value L:

$$L = A(\tan \xi),$$

where A is the pupil diameter and $\xi$ is the angle of inclination of the pencil of light rays in infinite space, and the telescope magnification $\Gamma$ of the telescope is in the range $-\frac{1}{3} \leq \Gamma \leq -3$.

The light conduction value of the tube optics of at least 0.35 makes it possible to fully utilize the resolution of a digital sensor having 2500 pixels in the image diagonal. This value is enough to operate optimally almost all the cameras currently in use in microscopy.

Telescopes of the Kepler type also have light conduction values (L) of at least 0.35 according to the invention. They image from infinite to infinite. According to embodiments of the invention, the telescopes image the apertures situated between the tube optics and the telescope in the rear focal point of the lens, so that it yields the usual telecentricity that is standard in microscopy.

This image is expediently achieved by the fact that the telescope consists of two collecting optical elements having focal distances f1' and f2' and the main element distances H1 and H2, wherein the optical elements are positioned in relation to one another in such a way that the rear focal point of the first optical element coincides with the front focal point of the second optical element, thus yielding a telescope magnification $\Gamma$ according to the equation:

$$\Gamma = -f1'/f2',$$

wherein the focal distance f2' of the second element is selected so that this equation applies:

$$2(f2')(1-\Gamma) + H1 + H2 = C,$$

wherein the transmission length C is predefined by the layout of the microscopic arrangement.

The telescope is positioned in such a way that the aperture is at the rear focal point of the second optical element of the telescope.

Furthermore, it has proven advantageous to arrange the front focal point of the tube optics so that it also coincides with the rear focal point of the second optical element of the telescope. This yields an image-sided telecentricity, which thus prevents fluctuations in the image scale in the focusing of the camera.

The light conduction value of the lens amounts to at least 1.4. Telecentricity prevails in the object space, since the aperture of the microscope is imaged in the rear focal point of the lens. The entrance pupil of the microscopic arrangement is situated in the infinite, so that all traditional contrast methods, such as phase contrast or DIC, for example, may be used. The very high light conduction value of the lens permits a particularly intense fluorescent illumination, for example, as the basic prerequisite for high-intensity fluorescent images. Since fluorescent lighting is usually injected downstream from the lens in infinite space, the full light conduction value of the lens can always be utilized.

DETAILED DESCRIPTION

An optical system for digital microscopy is explained in greater detail below on the basis of an exemplary embodiment, wherein the optical system can include two lenses, three telescopes and tube optics in various combinations.

Figure 1A:
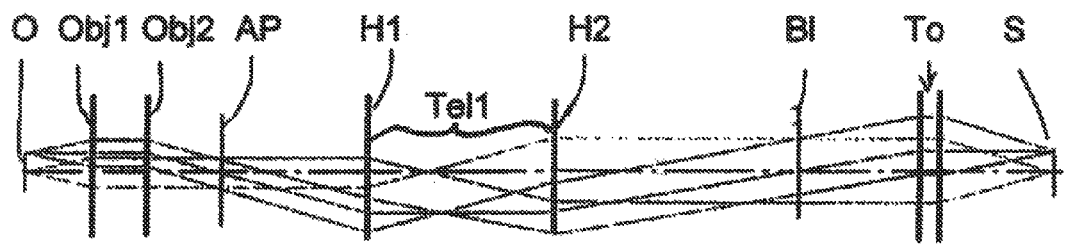
FIGS. 1a-1c are schematic diagrams of an optical system for digital microscopy according to embodiments of the present invention.
Figure 1B:
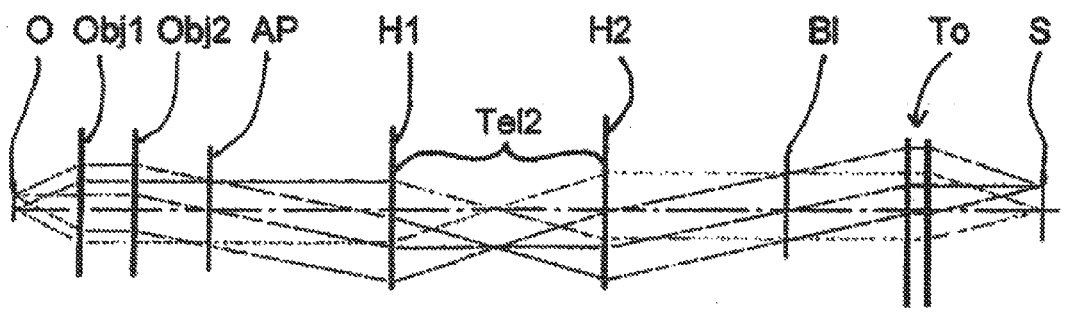
Figure 1C:
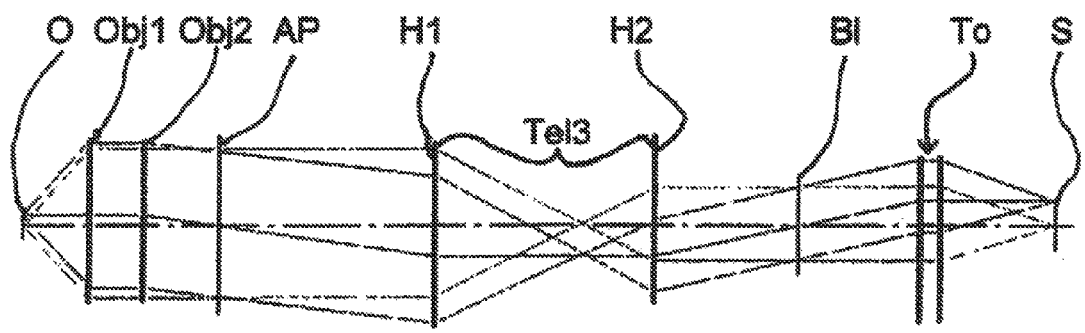

In a schematic diagram as depicted in FIGS. 1a-1c, starting with an object O, the Figures show the lens Obj1 or Obj2, the exit pupil AP of the lens Obj1 or Obj2, the telescope Tel1 in FIG. 1a, the telescope Tel2 in FIG. 1b, and the telescope Tel3 in FIG. 1c, an aperture B1, the tube optics To and a sensor S.

The system may be characterized by the following data:
Lens Obj1: focal distance f1 Obj1'=28 mm, numeric aperture 0.35, Lens Obj2: focal distance f1 Obj1'=7 mm, numeric aperture 1.4 (oil immersion), Telescope Tel1: f1'=94 mm, f2'=188 mm, Γ=−0.5, H1=H2=0, Telescope Tel2: f1'=141 mm, f2'=141 mm, Γ=−1.0, H1=H2=0, Telescope Tel3: f1'=188 mm, f2'=94 mm, Γ=−2.0, H1=H2=0, Tube optics To: focal distance F'=40 mm, Diameter of the aperture B1: 9.8 mm, Diameter of the sensor S: 11 mm, Pixel size: 3.5 μm, wherein f1' and f2' are the focal distances of the two collecting elements of the telescopes Tel1, Tel2 and Tel3, Γ is the telescope magnification and H1 and H2 are the main interplanar spacings. The two lenses Obj1 and Obj2 have a light conductance value of 1.54, while the telescopes Tel1, Tel2 and Tel3 as well as the tube optics To have a light conductance value of 0.385, i.e., exactly one-fourth of the light conductance value of the lenses Obj1 and Obj2. Because of the equation:

$$\beta = -f(\Gamma \cdot F')$$

wherein β is the microscope magnification, f' and F' are the focal distances of the lenses Obj1 and Obj2 as well as the tube optics, and Γ is the telescope magnification, the magnification β is small when using the telescope Tel1, moderate when using the telescope Tel2 and great when using the telescope Tel3. The same is also true of the numeric aperture. The size of the imaged object field has exactly the opposite relationship. The aperture B1 at the front focal point of the tube optics To is imaged in the joint exit pupil AP of the lens Obj1 or Obj2, which is situated at the rear focal point of the respective lens Obj1 or Obj2. The aperture image in the exit pupil AP of the lens Obj1 or Obj2 is small when using the telescope Tel1, moderate when using the telescope Tel2 and great when using the telescope Tel3.

The following table shows the fundamental parameters of the exemplary embodiment in various configurations. The exemplary embodiment offers the usual microscope magnifications between 2.5× and 40×. Furthermore, the numeric apertures also cover the usual spectrum between 0.0875 and 1.4. The lens needs to be changed only once, because this change is associated with a change from air immersion to oil immersion. The "tedious" lens changing operation is therefore reduced to a minimum.

| Lens | Telescope | Object field in mm | Magnification | Numeric aperture | Diameter of exit pupil lens in mm |
|------|-----------|--------------------|---------------|------------------|-----------------------------------|
| Obj1 | Tel1 | 4.4 | 2.5 | 0.0875 | 4.9 |
| Obj1 | Tel2 | 2.2 | 5 | 0.175 | 9.8 |
| Obj1 | Tel3 | 1.1 | 10 | 0.35 | 19.6 |
| Obj2 | Tel1 | 1.1 | 10 | 0.35 | 4.9 |
| Obj2 | Tel2 | 0.55 | 20 | 0.7 | 9.8 |
| Obj2 | Tel3 | 0.275 | 40 | 1.4 | 19.6 |

Since the front infinite space between lenses Obj1 or Obj2 and the telescopes Tel1, Tel2 or Tel3 is approximately the same size as the focal distance f1' of the respective front telescope element, this space is estimated to be approx. 90 mm in size. This space therefore offers enough room for incident light illumination and autofocus. The incident light illumination may utilize the full light conductance value L of the lenses Obj1 or Obj2, independent of the following telescopes Tel1, Tel2 or Tel3 and the tube optics To, and can ensure particularly intense fluorescent images. The contrasting and/or pupil intervention may be performed in the second infinite space, where more than 100 mm is definitely available.

What is claimed is:

1. An optical system for digital microscopy, having at least one lens, at least one telescope of the Kepler type and tube optics, wherein an aperture is arranged between the at least one telescope and the tube optics, the aperture imaged by the telescope at a rear focal point of the at least one lens, and wherein the following conditions are met simultaneously:

a light conductance value L of the at least one lens is ≥1.4;

a light conductance value L of the at least one telescope is ≥0.35; and a light conductance value L of the tube optics is ≥0.35, wherein the equation for light conductance value L is:

$$L = A(\tan \xi),$$

where A is a pupil diameter and ξ is an angle of gradient of a pencil of light rays in an infinite space, and wherein a microscope magnification (Γ) of the at least one telescope is in the range −⅓≤Γ≤−3.

2. The optical system for digital microscopy according to claim 1, wherein the telescope includes two collecting optical elements having focal distances f1' and f2' and main planar distances H1 and H2, wherein the two collecting optical elements are positioned relative to one another in such a way that a rear focal point of a first one of the optical elements coincides with a front or a rear focal point of a second one of the optical elements, thereby yielding a telescope magnification Γ of the telescope according to the equation:

$$\Gamma = -f1'/f2'$$

and wherein the focal distance f2' of the second element is selected according to the equation:

$$2(f2')(1-\Gamma) + H1 + H2 = C,$$

wherein C is a predetermined transmission length.

3. The optical system for digital microscopy according to claim 2, wherein the telescope is positioned so that the aperture is situated at the rear focal point of the second optical element of the telescope.

4. The optical system for digital microscopy according to claim 2, wherein the at least one lens is positioned so that the rear focal point thereof coincides with a front focal point of the first optical element of the telescope.

5. The optical system for digital microscopy according to claim 1, wherein the aperture is situated at a front focal point of the tube optics.

6. The optical system for digital microscopy according to claim 1, wherein more than one infinite space is provided in the system.

7. The optical system for digital microscopy according to claim 1, wherein one of a plurality of telescopes may arranged in the system interchangeably according to a constant value of C, for the purpose of changing a value of post-magnification β, determined according to the equation:

$$\beta = -f(\Gamma)(F'),$$

wherein f' and F' are the focal distances of the at least one lens and of the tube optics, respectively.

* * * * *

UNITED STATES PATENT AND TRADEMARK OFFICE
CERTIFICATE OF CORRECTION

PATENT NO. : 9,563,047 B2  
APPLICATION NO. : 14/614129  
DATED : February 7, 2017  
INVENTOR(S) : Rolf Wartmann Page 1 of 1

It is certified that error appears in the above-identified patent and that said Letters Patent is hereby corrected as shown below:

On the Title Page

<u>Item (57) In the Abstract</u>:  
Please delete the existing formula and insert the following formula:  
--$L=A(\tan\xi)$,--

Signed and Sealed this  
Fourteenth Day of April, 2020

Andrei Iancu  
*Director of the United States Patent and Trademark Office*